United States Patent [19]

Jamann

[11] 4,128,380
[45] Dec. 5, 1978

[54] FLUID PRESSURE ACTUATED DRIVE FOR THE CLOSING UNIT OF AN INJECTION MOULDING MACHINE

[75] Inventor: Helmut Jamann, Neustadt, Fed. Rep. of Germany

[73] Assignee: Dr. Boy KG, Fed. Rep. of Germany

[21] Appl. No.: 728,727

[22] Filed: Oct. 1, 1976

[30] Foreign Application Priority Data

Oct. 2, 1975 [DE] Fed. Rep. of Germany ....... 2544105

[51] Int. Cl.² .......................... A01J 21/00; F15B 11/00
[52] U.S. Cl. .................................. 425/450.1; 91/508; 91/416; 91/422; 91/438; 91/470; 251/59
[58] Field of Search ............... 425/450.1; 91/415, 416, 91/422, 467, 413, 414, 461, 470, 436, 437, 438, 411 B; 92/166; 251/59, 304, 309

[56] References Cited

U.S. PATENT DOCUMENTS

| | | | |
|---|---|---|---|
| 2,872,700 | 2/1959 | Knowles | 425/450.1 |
| 3,202,179 | 8/1965 | Vockroth, Jr. | 251/59 |
| 3,603,210 | 9/1971 | Florjancic | 91/416 |
| 3,722,368 | 3/1973 | Suzuki | 91/422 |
| 3,818,801 | 6/1974 | Kime | 91/422 |
| 3,827,335 | 8/1974 | Lewis | 91/467 |
| 3,920,364 | 11/1975 | Cadojan et al. | 425/450.1 |
| 4,021,181 | 5/1977 | Hehl | 425/450.1 |

FOREIGN PATENT DOCUMENTS

| | | | |
|---|---|---|---|
| 233848 | 3/1909 | Fed. Rep. of Germany | 91/422 |
| 1964075 | 6/1971 | Fed. Rep. of Germany | 425/450.1 |
| 2146515 | 3/1973 | Fed. Rep. of Germany. | |

*Primary Examiner*—Martin P. Schwadron
*Assistant Examiner*—Abraham Hershkovitz
*Attorney, Agent, or Firm*—Beall & Jeffery

[57] ABSTRACT

A fluid pressure actuated drive for providing for the closing unit of an injection moulding machine a to and fro traversing motion of a movable part of the unit with little force and a clamping of the closed unit with a greater force. The device has at least two double acting piston and cylinder devices which act in parallel and the pistons of which each have at each side a piston rod which passes through a seal in the responsive adjacent cylinder end. The piston rod on one side of at least one piston is thicker than that on its other side and the piston rod on one side, which corresponds to the same working side as one side of the one piston, of the or each other piston is thinner than that on its other side. Traverse in one direction is provided by applying fluid pressure to both sides of the one piston, and in the other direction by providing fluid pressure to both sides of the other piston. Clamping pressure is provided by applying fluid pressure to one side only of each of the pistons.

14 Claims, 4 Drawing Figures

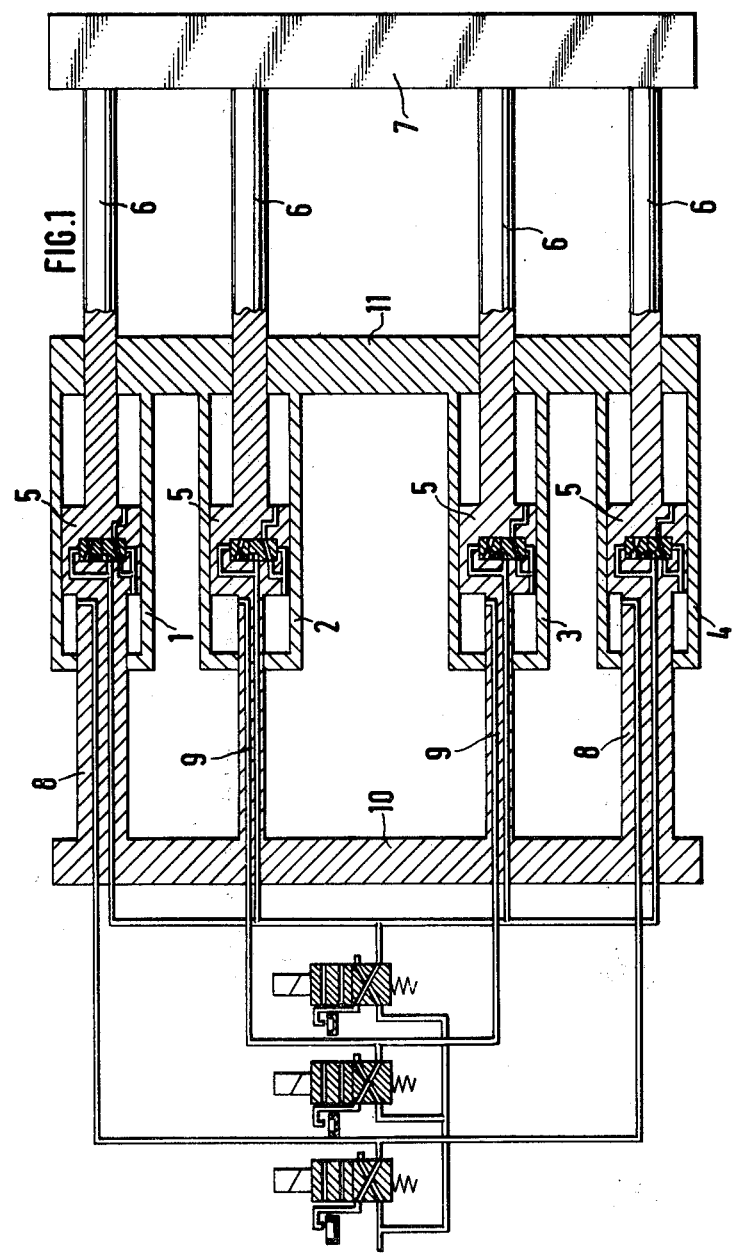

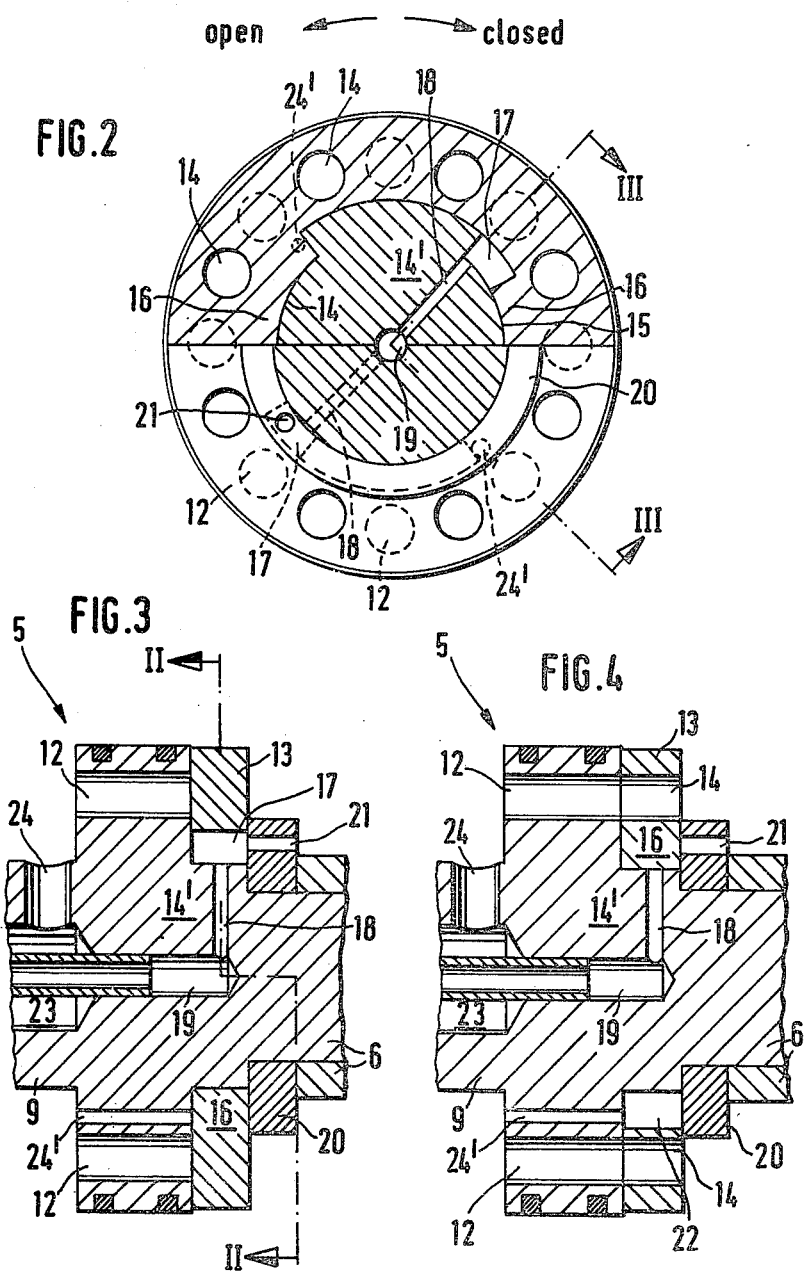

FLUID PRESSURE ACTUATED DRIVE FOR THE CLOSING UNIT OF AN INJECTION MOULDING MACHINE

The invention refers to a fluid pressure actuated drive for closing units of injection moulding machines for creating a to and fro traversing motion of a movable part of the unit with little force and a clamping of the closed unit with a greater force, the device having at least two double acting piston and cylinder devices which act in parallel and the pistons of which have at each side a piston rod which passes through a seal in a respective adjacent cylinder end. Such a drive is hereinafter referred to as of the kind described.

In the case of known drives of this kind (West German OS No. 1,778,952) the double acting pistons are combined with further pistons in order on the one hand to bring about the traversing motion and on the other hand the clamping. These additional pistons may engage as separate units with the component actuated by the drive. The possibility also exists of mounting these additional pistons on the piston rods of the double acting pistons. Furthermore these piston rods themselves may operate as auxiliary pistons or cylinders. In all cases allowance must be made for a considerably outlay in constructional and control technique.

The object of the invention is to simplify the known mechanism of the aforesaid kind.

In accordance with the invention, in a drive of the kind described the piston rod on one side of at least one piston is thicker than that on its other side, and the piston rod on one side, which corresponds to the same working side as the one side of the one piston, of the or each other piston is thinner from that on its other side.

With this construction the additional pistons are eliminated. The double acting pistons are adequate for creating both the traversing motion and also the clamping. The or each one piston is used for performing the traversing motion in one direction, that is, with both sides of the piston being acted upon by fluid pressure at the same time. Because of the difference in diameter of the piston rods there result corresponding differential working areas on opposite sides of the piston. If the or each other piston is then acted upon in the same way, the first pistons being relieved of pressure, the drive produces travel in the opposite direction. For creating the clamping force the whole of the pistons are relieved of pressure on one side and acted upon by pressure on the other side.

Altogether an extremely compact and simple construction is thus achieved. For each cylinder merely two fluid pressure leads are needed. The switching sequence of these pressure leads is extremely simple, namely:

(a) both leads free of pressure;
(b) one lead subjected to pressure, one lead free of pressure.
(c) both leads subjected to pressure.

For closing units for injection moulding machines it is of considerable significance to perform the traversing motion rapidly and with little force, and subsequently to apply in one direction the highest possible clamping force. By appropriate selection of the differences in the thicknesses i.e., cross sectional areas, of the piston rods the differences in size of the working areas on the two sides can be made extremely small.

The traversing motions are effected correspondingly quickly, without affecting the magnitude of the clamping or locking force.

Preferably there is a symmetrical square arrangement of four piston and cylinder devices, the devices lying respectively diagonally opposite to one another being similar to one another. Thus two pistons lying diagonally opposite one another take care of the traversing motion in one direction, whilst the other two are responsible for the traversing motion in the other direction. All the pistons take part in creating the clamping force.

For constructional reasons it is advantageous if the piston rods on one of the corresponding working sides of each of the pistons are of equal thickness. In that case merely three different piston rod diameters are needed.

The piston rods may be formed as stationary spars supported adjacent to their ends and containing the ducts for the fluid. In this case the movable part of the closing unit, that is the carrier for the movable half of the mould is attached to the cylinders of the drive. These cylinders move together on the associated piston rods. Separate pressure pipes are then not necessary. Preferably the ducts also run through a crossbeam to which the piston rods on one side of the pistons are supported. This crossbeam may then provide the whole of the connections for the fluid and if necessary the individual control elements.

It is particularly simple if the ducts run coaxially through the piston rods.

As already mentioned, the speed of traverse in the case of drives for closing units of injection moulding machines plays an essential part. During the traversing stroke the respective pistons are subjected to pressure simultaneously from both sides. Thus the pressure medium must flow across from one side of the piston to the other. For this purpose the practice is known of equipping the piston with a plurality of closable channels. But hitherto it was not possible to design the conditions of flow inside these channels to be the optimum. Allowance had to be made for deflections and reductions in cross section, that is, not only in the case of the employment of non-return valves in each channel, but also when a common valve member was provided for the whole of the channels. This common valve member had of course to be actuated in the axial direction.

In accordance with a further feature of the invention, at least one piston has a plurality of closable channels which allow the fluid flow across from one side of the piston to the other, the channels being closable by a perforated disc provided with corresponding openings and angularly adjustable. If the perforated disc adopts its one switched position in which the channels are open, this corresponds with the piston being acted upon by pressure on both sides at the same time. The fluid can be led from one side of the piston to the other with extremely low friction, that is, through the channels and the connecting openings in the perforated disc. There need be no deflections in or obstruction of any kind to the flow.

In the closed position the perforated disc covers over the channels and in this way seals off from one another the two cylinder volumes lying on opposite sides of the piston. This position is used for creating the clamping force, one side of the piston being relieved of pressure while the other is subjected to pressure.

The construction is simple, economical and reliable. Also it operates practically without maintenance.

Should repairs nevertheless be necessary, these can be performed with little outlay.

Preferably one of the perforated disc and a mounting for the disc is provided with at least one recess and the other with a shoulder which divides the recess into two sealed chambers, and means are provided for selectively supplying fluid to one or other of the chambers for rotating the disc between open and closed positions. When one chamber is supplied with fluid under pressure, the perforated disc moves into its closed position, whilst when the other chamber is supplied with fluid under pressure, it opens the channels. The recess may be formed in the perforated disc, in which case the shoulder projecting into the recess is connected solidly to the mounting of the perforated disc. Obviously the arrangement may also be formed the other way round.

The shoulder may engage in the recess in the axial direction. The recess under these circumstances lies in one of the side faces of the perforated disc or mounting respectively. For reasons of manufacturing technique it is however preferable that the recess be formed between the radial inner face of the perforated disc and the radial outer face of its mounting.

In one particularly useful construction one chamber is open to one side of the piston and the second chamber is connected with a fluid supply duct passing through a piston rod, upon subjecting which duct to pressure the channels are closed and the cylinder volumes on opposite sides of the piston sealed off from one another, the second chamber being connectd to a passage, which, when the second chamber is acted upon by pressure, is open to the cylinder volume on the side of the piston remote from the piston rod through which the fluid supply duct passes. Thus during traversing stroke the one side of the piston is acted upon by pressure medium. The pressure medium at the same time penetrates into the one chamber and keeps the perforated disc in its open position. Thus at both sides of the piston the same pressure prevails and the pressure medium can flow through the channels in the piston. For creating the clamping force the other chamber is acted upon by pressure. In that case the perforated disc moves into its closed position in which it covers over the channels. At the same time it opens the passage leading to the other side of the piston. The pressure medium thus acts upon this other side of the piston. Since at the same time pressure is switched off the opposite side of the piston the clamping force results.

The essential advantage of this arrangement lies in the fact that for switching the peforated disc no additional mechanism or pressure medium leads of any kind are needed. The perforated disc moves automatically into its correct position in dependence upon which of the cylinder volumes is being acted upon by pressure. Thus the two feed leads which are there anyhow are adequate. Also no springs or the like are necessary, as is the case with non-return valves.

A further advantageous feature lies in the employment of a stationary ring containing the passage and seated on the side of the piston adjacent to the chambers. The piston thus consists of the mounting, the perforated disc and the ring connected in front of it. The construction is accordingly as simple as could be imagined.

An example of a drive constructed in accordance with the invention is illustrated in the accompanying drawings, in which:

FIG. 1 shows diagrammatically a closing unit for a plastics injection moulding machine;

FIG. 2 is a section perpendicular to the axis through one of the pistons which can be acted upon on both sides, and taken on the line II—II in FIG. 3;

FIG. 3 is a section taken on the line III—III in FIG. 2, with the perforated disc in the closed position; and, FIG. 4 is a section corresponding with FIG. 3, with the perforated disc in the open position.

As shown in FIG. 1 the fluid pressure actuated drive comprises four cylinders 1,2,3 and 4 which though shown lying side by side are, however, in practice arranged in a square configuration. Each cylinder contains a double acting piston 5. The arrangement is so formed that the cylinders 1 and 4 on the one hand and the cylinders 2 and 3 on the other hand lie diagonally opposite one another and are similarly formed.

Each of the pistons 5 is connected on the righthand side to a piston rod 6. The piston rods 6 have equal diameters. They are supported by a crossbeam 7 which carries the carrier for the stationary half of the mould. On the lefthand side the pistons are connected to piston rods which respectively in relation to the associated piston rod 6 exhibit a different diameter, that is, the piston rods 8 of the cylinders 1 and 4 are thicker and the pistons rods 9 of the cylinders 2 and 3 thinner than the piston rods 6. The piston rods 8 and 9 are supported by a crossbeam 10. The cylinders 1 to 4 are connected by a further crossbeam 11 which is movable to and fro relative to the piston rods and to the crossbeam 7 and carries the movable carrier for the movable half of the mould.

Each cylinder has two pressure medium ducts which run through the piston rods 8 and 9 respectively and the crossbeam 10. As follows in particular from FIGS. 3 and 4 these ducts are arranged coaxial with one another.

From the circuit diagram shown schematically in FIG. 1 there results the following method of operation. If the mould is to be closed, i.e., if the crossbeam 11 is to be moved in the direction towards the crossbeam 7, the pistons 5 in the cylinders 1 and 4 are acted upon by pressure medium on both sides at the same time. The cylinders 2 and 3 remain free of pressure. Because of the difference in area of the piston rods 8 and 6 the crossbeam 11 is moved towards the right on FIG. 1. At the end of this traversing stroke the left hand sides of all the pistons 5 are relieved of pressure and the right hand sides of the whole of the pistons are acted upon by pressure. This causes the clamping force necessary to the closing of the mould. After the conclusion of the injection stroke the crossbeam 11 is traversed again towards the left, that is, by the pistons 5 in the cylinders 2 and 3 being acted upon by pressure on both sides, whilst the cylinders 1 and 4 are kept free of pressure. Because of the difference in area of the piston rods 9 with respect to the piston rods 6 the closing unit opens.

All the pistons 5 are so formed that the pressure medium can flow across through the pistons from one cylinder volume into the other whilst the crossbeam 11 performs its traversing motions. During the creation of the clamping force on the contrary no crossflow of pressure medium is possible.

FIGS. 2 to 4 show such a construction that is, on the basis of a piston as used in cylinders 2 and 3.

According to FIGS. 2 to 4 this piston 5 has in its body channels 12. On the righthand side of the body of the piston a perforated disc 13 is arranged. The openings 14 in this perforated disc are arranged just like the channels 12 in a ring and align with them when the perforated disc adopts its open position. FIG. 2 shows the arrangement in the closed position of the perforated disc.

As follows in particular from this Figure, in the mounting 14' for the perforated disc 13 two radial recesses 15 are provided. Associated shoulders 16 on the perforated disc 13 engage in these, that is, in such a way that a chambers 17 and 22 car form on the sides of each shoulder. By acting upon the respective pairs of chambers with pressure medium the perforated disc is switched to and fro between its closed position and its open position.

As already mentioned, in FIG. 2 the perforated disc is shown in its closed position. The chambers 17 are accordingly being acted upon by pressure medium, that is, via channels 18 which extend outwards radially from a central bore 19. These conditions appear more clearly in FIG. 3.

In front of the perforated disc 13 is seated a ring 20 which has passages 21. As long as the perforated disc 13 adopts its open position in accordance with FIG. 4 these passages 21 are closed, that is, by the shoulders 16 on the perforated disc. In the closed position in accordance with FIGS. 2 and 3 on the contrary the passages 21 lie on a level with the chambers 17 being acted upon by fluid pressure. Thus in the open position of the passages 21, the fluid comes through the central bore 19, the channels 18, the chambers 17 and the passages 21 into the cylinder volume lying on the right of the piston; this fluid to the right of the piston is sealed off by the perforated disc from the left hand cylinder volume. Pressure is switched off the latter and in this way the clamping force is built up.

In the open position in accordance with FIG. 4 on the contrary the other chambers 22 are acted upon by pressure meduim. The pressure medium comes through an annular duct 23 and a radial bore 24 into the cylinder volume lying on the left of the piston. Thence bores 24' lead into the chambers 22. If the chambers 22 are acted upon by pressure medium whilst the cylinder volume lying on the right of the piston is free of pressure, the perforated disc switches automatically into its open position. In that case the openings 14 in the perforated disc switch automatically into their open position. In that case the openings 14 in the perforated disc line up with the channels 12 in the piston. Thus in both cylinder volumes the same pressure prevails so that traversing motion of the drive in dependence upon the differences in the piston rods follows. The passages 21 are closed so that no fluid can flow back into the piston rod. At the end of this traversing motion which is used for opening the closed unit the perforated disc is lying the same as before in its open position. Upon closing the mould pressure is switched off both sides of the piston in cylinders 2 and 3 and the pressure medium can again flow through the channels.

In the case of the cylinders 1 and 4 the ratios of the diameters of the piston rods lie the other way round from those of cylinders 2 and 3. The construction of the piston is exactly the same as in the case of the cylinders 2 and 3 but the switching of the pressure medium admission is altered. If the cylinder volume lying respectively at the left hand side of the piston is put under pressure the perforated disc moves into its open position so that the right hand side of the piston is likewise acted upon by pressure. Because of the differences in the piston rods the mould is closed whilst the fluid flows through the channels in the piston. Next, pressure medium is introduced into the chambers 17 in the piston and in this way the perforated disc is closed and the right hand side of the piston is put under pressure whilst pressure is switched off the left hand side of the piston. The clamping force is thereby created. During the subsequent opening of the mould the pressure medium must flow across from the right hand side of the piston to the left hand side, both sides being kept free of pressure. In contrast to cylinder 2 and 3 the perforated disc here does not adopt its open position at the start of the pressureless crossflow. Also it does not automatically come into this position since the crossflow is taking place from right to left. A short pressure pulse is accordingly given to the left hand side of the piston in order to open the perforated disc by briefly pressuring chambers 22.

I claim:

1. In a hydraulic mold closing unit of an injection molding machine, an improved fluid pressure actuated drive for providing a to and fro transverse motion of a movable part of said unit, said drive including a piston rod defining an axis, a double acting piston mounted on one axial end of said rod, a cylinder passing said rod through one axial end and receiving said piston to form two expansible chambers on opposite axial sides of said piston, one of said piston rod and cylinder being stationary and the other being drivingly attached to the movable part, a plurality of flow channels extending through said piston from one expansible chamber to the other expansible chamber, a disc mounted on said piston for limited rotation with respect to said piston about the axis between closed and opened positions, said disc having a plurality of flow channels extending through it in axial alignment respectively with the flow channels of said piston in said open position to freely provide the flow of fluid from one expansible chamber to the other expansible chamber and being completely out of alignment in said closed position to prevent the flow of fluid from one chamber to the other, said piston and disc together forming at least two expansible disc chambers for pressurization of one disc chamber with a fluid to move said disc into said open position and for pressurization of the other disc chamber with a fluid to move said disc into its closed position, one of said disc and piston being provided with at least one recess and the other of said disc and piston being provided with a shoulder dividing said recess into said disc chambers, means provided for selectively supplying fluid to one or the other of said disc chambers for rotating said disc between said open and closed positions, a first fluid duct extending from outside of said cylinder to said one cylinder expansible chamber for pressurizing said one cylinder expansible chamber, and said means for supplying providing said one disc chamber open to said one cylinder expansible chamber and including a second fluid duct isolated from said one cylinder chamber and axially passing through said piston rod to said other disc chamber for supplying pressurized fluid to said other disc chamber to rotate said disc to its closed position to isolate the cylinder expansible chambers on opposite sides of said piston and passage means connecting said other disc chamber to said other cylinder expansible chamber when said other disc chamber is subjected to fluid pressure.

2. A drive according to claim 1, wherein said recess is formed between a radial innerface of said perforated disc and a radial outerface of said piston.

3. A hydraulic mold closing and according to claim 1, including a stationary ring seated on said piston on the side piston on the side of said piston adjacent to said disc chambers and having therein said passage means.

4. A hydraulic mold closing unit according to claim 3, wherein said disc is mounted on a cylindrical bearing surface of said piston, axially abuts said piston on one side and axially abuts said stationary ring on its other side; said second fluid duct including said piston having an axial duct aligned and connected with a piston rod duct, and a radial duct extending from its axial duct through its cylindrical bearing surface into said other disc chamber to provide the connection between said other disc chamber and said piston rod duct.

5. A hydraulic mold closing unit according to claim 4, said first duct being located within said piston rod and concentric with but out of communication with said piston rod duct, said piston rod having a radial bore extending from said first duct to the expansible chamber on the side of said piston in common with said piston rod.

6. A hydraulic mold closing unit according to claim 5, including a second piston rod connected at one end to the side of said piston opposite from the first mentioned piston rod, said second piston rod extending through the axial end of said cylinder opposite from the end through which the first mentioned piston rod, extends and said second piston rod having a diameter different from the diameter of said first piston rod to provide an effective piston area in one of said cylinder expansible chambers that is different from the effective piston area in the other of said cylinder expansible chambers, so that with said disc in its open position the fluid pressure will be equalized in both of said expansible chambers to provide a force on said piston proportional to the difference in effective areas, and when said disc is in its closed position fluid pressure may be supplied through said piston rod duct, other expansible disc chamber, and passage means into only one of the cylinder expansible chambers while venting the opposite cylinder expansible chamber through said first duct to provide a force on said piston proportional to the full effective area of the piston side in common with the cylinder expansible chamber having said passage means opening into it.

7. A hydraulic mold closing unit according to claim 6, further including a second drive in parallel force relationship with said first mentioned drive and identical to said first mentioned drive, the first mentioned piston rod of the second drive being larger than its second piston rod and larger than the first mentioned piston rod of the first mentioned drive, and further wherein the second piston rods are of equal diameter.

8. A hydraulic mold closing unit according to claim 1, wherein said first duct is in said piston rod out of communication with and concentric with said second duct in said piston rod.

9. A hydraulic mold closing unit according to claim 8, including a second piston rod connected to said piston on the side opposite from said first mentioned piston rod and extending through said cylinder end opposite from the end through which said first mentioned piston rod extends, said first mentioned piston rod and said second piston rod being of different diameters so as to provide different effective piston areas in said cylinder expansible chambers so that when said disc is in its open position the fluid pressure within said cylinder expansible chambers will be equalized to provide a net force on said piston corresponding to the difference in effective piston areas, and when said disc is in its closed position fluid pressure may be provided to only one of said cylinder expansible chambers to provide a net force on said piston corresponding to the effective piston area of said one cylinder expansible chamber.

10. A hydraulic mold closing unit according to claim 9, further including a second drive in parallel force relationship with the first mentioned drive and identical with the first mentioned drive, the first mentioned piston rod of the second drive being larger than its second piston rod and larger than the first mentioned piston rod of the first mentioned drive, and further wherein the second piston rods are of equal diameter.

11. A drive according to claim 8, wherein said disc blocks said passage means when said disc is in its open position to prevent fluid communication between said other cylinder expansible chamber and said second fluid duct.

12. A hydraulic mold closing unit according to claim 1, including a second piston rod connected to said piston on the side opposite from said first mentioned piston rod and extending through said cylinder end opposite from the end through which said first mentioned piston rod extends, said first mentioned piston rod and said second piston rod being of different diameters so as to provide different effective piston areas in said cylinder expansible chambers so that when said disc is in its open position the fluid pressure within said cylinder expansible chambers will be equalized to provide a net force on said piston corresponding to the difference in effective piston areas, and when said disc is in its closed position fluid pressure may be provided to only one of said cylinder expansible chambers to provide a net force on said piston corresponding to the effective piston area of said one cylinder expansible chamber.

13. A hydraulic mold closing unit according to claim 12, further including a second drive in parallel force relationship with the first mentioned drive and identical with the first mentioned drive, the first mentioned piston rod of the second drive being larger than its second piston rod and larger than the first mentioned piston rod of the first mentioned drive, and further wherein the second piston rods are of equal diameter.

14. A drive according to claim 1, wherein said disc blocks said passage means when said disc is in its open position to prevent fluid communication between said other cylinder expansible chamber and said second fluid duct.

* * * * *